United States Patent
Williams et al.

(10) Patent No.: US 7,267,385 B2
(45) Date of Patent: Sep. 11, 2007

(54) VEHICLE TRIM LOCATING AND ATTACHMENT SYSTEM

(75) Inventors: Michael Williams, Northville, MI (US); Peter Bejin, Northville, MI (US); Kaushlendra Singh, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 11/161,836

(22) Filed: Aug. 18, 2005

(65) Prior Publication Data

US 2007/0040404 A1 Feb. 22, 2007

(51) Int. Cl.
B62D 27/00 (2006.01)
(52) U.S. Cl. ...................................... 296/29
(58) Field of Classification Search ................ None
See application file for complete search history.

(56) References Cited

U.S. PATENT DOCUMENTS

| | | | | |
|---|---|---|---|---|
| 3,342,000 A | * | 9/1967 | Cripe | 52/468 |
| 3,764,446 A | * | 10/1973 | Martin | 428/52 |
| 4,420,859 A | | 12/1983 | Hammerle | |
| 4,665,285 A | * | 5/1987 | Shiraishi | 200/61.62 |
| 4,707,020 A | * | 11/1987 | Enokida et al. | 296/191 |
| 4,716,633 A | | 1/1988 | Rizo | |
| 4,861,208 A | | 8/1989 | Boundy | |
| 4,895,405 A | * | 1/1990 | Sasatake et al. | 293/102 |
| 4,895,406 A | * | 1/1990 | Goesse et al. | 293/102 |
| 4,917,426 A | * | 4/1990 | Copp | 293/142 |
| 5,345,721 A | | 9/1994 | Stein et al. | |
| 5,507,610 A | | 4/1996 | Benedetti et al. | |
| 5,580,204 A | | 12/1996 | Hultman | |
| 5,934,729 A | | 8/1999 | Baack | |
| 5,975,820 A | | 11/1999 | Kirchen | |
| 6,039,523 A | | 3/2000 | Kraus | |
| 6,238,157 B1 | | 5/2001 | Davis, Jr. et al. | |
| 6,594,870 B1 | | 7/2003 | Lambrecht et al. | |
| 6,811,210 B2 | * | 11/2004 | Granger et al. | 296/191 |
| 6,824,201 B2 | * | 11/2004 | Miyazaki | 296/193.06 |
| 6,942,280 B2 | * | 9/2005 | Hintzke et al. | 296/181.2 |
| 6,959,954 B2 | * | 11/2005 | Brandt et al. | 296/1.08 |
| 7,104,594 B2 | * | 9/2006 | Granger et al. | 296/191 |
| 2001/0052210 A1 | * | 12/2001 | Mizutani et al. | 52/208 |
| 2002/0030368 A1 | * | 3/2002 | Kurek et al. | 293/154 |
| 2004/0084918 A1 | * | 5/2004 | Brandt et al. | 296/1.08 |
| 2004/0124650 A1 | * | 7/2004 | Del Pozo Abejon | 296/1.07 |

* cited by examiner

*Primary Examiner*—H Gutman
(74) *Attorney, Agent, or Firm*—Dykema Gossett PLLC

(57) ABSTRACT

A vehicle trim component locating and attachment system is provided for connecting a trim component to a vehicle base panel having an aperture. The system includes a locator projection integrally formed on the component and including first and second ends. The first end is configured to project through the panel aperture, and the second end is configured to receive a screw. The projection provides for location of the component relative to the panel, and further provides for secure attachment of the component to the panel by the screw. A method of locating and connecting vehicle components is also provided. The method includes the steps of forming an aperture in a panel, providing a component for attachment to the panel, with the component including a projection as described herein, and attaching the component to the panel by inserting a screw in the projection while the projection is positioned within the aperture.

22 Claims, 1 Drawing Sheet

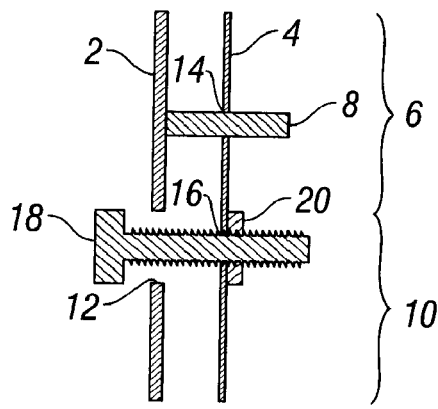
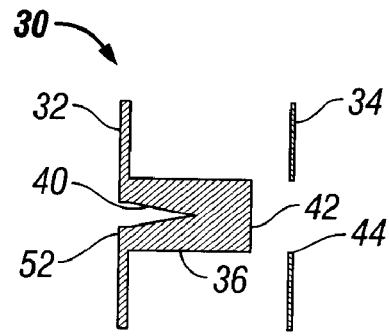
FIG. 1
(Related Art)
FIG. 2
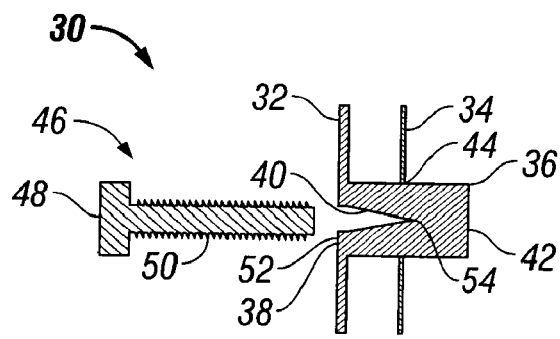
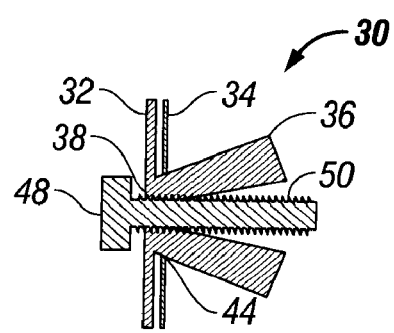
FIG. 3
FIG. 4
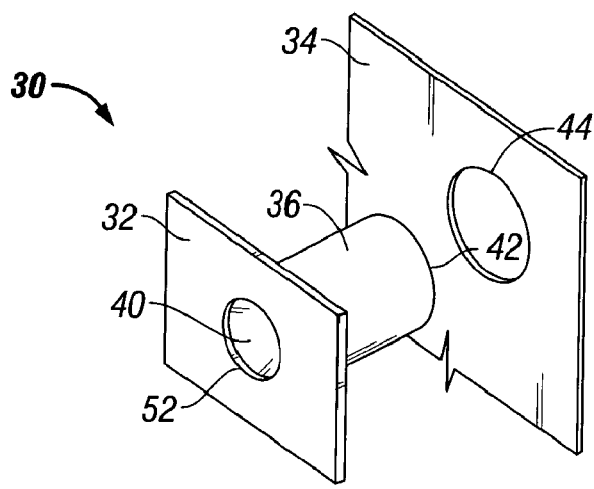
FIG. 5

VEHICLE TRIM LOCATING AND ATTACHMENT SYSTEM

BACKGROUND OF INVENTION

1. Field of Invention

The invention relates generally to a system for attachment of vehicle components, and, more particularly, to a vehicle trim locating and attachment system including a unique locator projection for providing dual locating and attachment functions.

2. Description of Related Art

The interior and exterior of a vehicle typically include a variety of molding and trim components which are attached to a base panel or a frame made of metal and the like. Known methods of attaching such components to the vehicle frame include bonding of the component to the frame, snap-fitting of the component in a complementary insert provided in the frame and/or removably attaching the component by fasteners and other such attachment means. In order to facilitate replacement as well as the attachment process for such components, it is often preferable to removably attach the components by fasteners as opposed to the bonding thereof.

Conventional methods of removably attaching molding and trim components require the components to first be located (i.e. properly aligned) relative to a base panel or frame member, and thereafter attached to the panel or frame member by means of one or more fasteners, such as a screw/nut combination, a j-clip and the like.

Referring to FIG. 1, an exemplary conventional attachment method using fasteners is illustrated. As shown in FIG. 1, an exterior or interior component 2 (i.e. vehicle trim) is illustrated as being attached to a vehicle frame or panel 4. Component 2, which is typically formed of plastic or other moldable materials, and/or includes a base plastic layer, has a locating area 6 having a locator pin 8 formed thereon, and further has an attachment area 10 having an aperture 12 formed therein. Panel 4, which is typically formed of metal, includes a first aperture 14 sized to allow insertion of locator pin 8 and a second aperture 16 sized to allow insertion of a screw 18 or another such fastener. In order to attach component 2 to panel 4, component 2 is first located relative to panel 4 by inserting locator pin 8 into aperture 14. As shown, screw 18 is thereafter inserted into apertures 12 and 16, and a nut 20 is used to fasten the screw as needed.

As readily evident, the conventional attachment method described above with reference to FIG. 1 is inefficient and cost-prohibitive for several reasons. For example, during the manufacture of component 2, one or more locator pins and apertures must be separately formed in component 2. Further, a complementary aperture for insertion of the locator pin and a separate aperture for insertion of a screw must be formed in panel 4. Thereafter, during the assembly process, component 2 must first be located relative to panel 4 by insertion of the locator pin into its complementary aperture. While component 2 is held in position, a screw must be inserted into the apertures of component 2 and panel 4, and a separate nut then fastened to the screw. These manufacturing and assembly requirements thus play a significant role in increasing the overall cost associated with trim components. Yet further, the provision of separate locating and attachment areas (6, 10) is often problematic due to limited tool accessibility, which must also be taken into consideration for such trim component design.

For the conventional trim component attachment method described above, it would therefore be of benefit to provide a component attachment system which eliminates and/or minimizes the requirements for manufacturing separate locator pins and/or apertures in a trim component, as well as in the vehicle frame or base panel, and which further eliminates the need for separate locating and attachment assembly operations during the component attachment process.

Yet further, other prior-art component attachment systems and techniques are known and disclosed, for example, in U.S. Pat. No. 4,861,208 to Boundy. Referring to FIGS. 8-10 of Boundy, there is disclosed a door trim panel fastening assembly including a male member 10 and a corresponding female member 40. A door trim panel 72, which is to be attached to inner door panel 80, is provided with a projection 74, which further includes a slot 70 having a circular portion 78 for engaging male member 10. As shown in FIGS. 9 and 10, inner door panel 80 includes an aperture 82 for receiving press-fitted members 10 and 40, thereby fastening door trim panel 72 to door panel 80.

As readily evident form the illustrations in FIGS. 8-10 of Boundy, since female member 40 is susceptible to being detached from or pivoted relative to male member 10 during assembly of door trim panel 72 to door panel 80, the door trim panel fastening assembly disclosed in Boundy does not provide a repeatable locating function, which is critical to proper and efficient alignment and attachment of trim panel 72 to inner door panel 80. Thus without a proper locating function, alignment of the trim panel to the door panel is likely to be incorrect and/or skewed during attachment, since alignment of the trim panel to the door panel relies solely upon the screw type fastener. Further, reliance on the screw type fastener as the only connection leaves open the possibility of the trim panel being readily removed from the door panel.

It would therefore also be of benefit to provide an attachment system that provides location capabilities for thus preventing misalignment during fastening and/or attachment. Yet further, since the door trim fastening assembly of Boundy includes multiple components as illustrated in FIGS. 8-10 thereof, it would also be of benefit to provide an attachment system with a minimal number of components for reducing the overall manufacturing cost for such systems, and for further minimizing the odds of failure of the attachment system.

Accordingly, based upon the discussion above, there remains a need for a vehicle trim locating and attachment system, which provides efficient component connection capabilities, which is economically feasible to manufacture and utilize during installation of components in a fast-paced vehicle assembly line, and which provides for efficient locating and attachment functions, as well as stability and durability to the finished trim and panel combination.

SUMMARY OF INVENTION

The invention solves the problems and overcomes the drawbacks and deficiencies of prior art vehicle trim locating and attachment systems by providing a novel method and apparatus including a vehicle trim or similar component having a unique locator projection for providing dual locating and attachment functions.

Specifically, the invention provides a vehicle trim component locating and attachment system for connecting a trim component to a vehicle base panel having an aperture. The system may include a locator projection integrally formed on the trim component and including first and second ends. The locator projection first end may be configured to substantially fit and project through the vehicle base panel aperture, and the second end may be configured to receive a screw. The locator projection may thus provide for location of the trim component relative to the vehicle base panel, and further provide for secure attachment of the trim component to the vehicle base panel by the screw.

For the vehicle trim component locating and attachment system described above, the locator projection may be deformable or divisible from a disengaged position to an engaged position when the screw is received therein. In the disengaged position, the locator projection may removably fit and project through the vehicle base panel aperture. Further, in the engaged position, the second end may contract around the screw to retain the screw in position and the first end may expand substantially broader than the vehicle base panel aperture to connect the trim component to the vehicle base panel. The second end of the locator projection may include a substantially conical opening in the form of an indentation for receiving and maintaining the screw in position. The conical opening may be deformable or divisible upon receiving the screw therein. The trim component may be made of plastic or another moldable material. In a particular embodiment of the present invention, the locator projection may be a halved pin. Further, in a particular embodiment of the present invention, the second end of the locator projection may be disposed substantially flush to an outer surface of the trim component.

The invention also provides a vehicle component locating and attachment system for connecting a component to a vehicle base structure having an aperture. The system may include a locator projection integrally formed on or fixedly attached to the component and including first and second ends. The locator projection first end may be configured to substantially fit and project through the vehicle base structure aperture, and the second end may be configured to receive an attachment means. The locator projection may thus provide for location of the component relative to the vehicle base structure, and further provide for secure attachment of the component to the vehicle base structure by the attachment means.

For the vehicle component locating and attachment system described above, the locator projection may be deformable or divisible from a disengaged position to an engaged position when the attachment means is received therein. In the disengaged position, the locator projection may removably fit and project through the vehicle base structure aperture. In the engaged position, the second end may contract around the attachment means to retain the attachment means in position, and the first end may expand substantially broader than the vehicle base structure aperture to connect the component to the vehicle base structure. The second end of the locator projection may include a substantially conical opening in the form of an indentation for receiving and maintaining the attachment means in position. The conical opening may be deformable or divisible upon receiving the attachment means therein.

The invention yet further provides a method of locating and attaching vehicle trim components. The method may include the steps of forming an aperture in a vehicle base panel, and providing a trim component for attachment to the vehicle base panel, with the trim component including a locator projection including first and second ends. The first end may be configured to substantially fit and project through the aperture. The method may further include the steps of locating the trim component relative to the vehicle base panel by inserting the locator projection within the aperture, and attaching the trim component to the vehicle base panel by inserting a screw in the locator projection while the locator projection is positioned within the aperture in the vehicle base panel.

For the method described above, the locator projection may be deformable or divisible from a disengaged position to an engaged position when the screw is received therein. In the disengaged position, the locator projection may removably fit and project through the vehicle base panel aperture. In the engaged position, the second end may contract around the screw to retain the screw in position and the first end may expand substantially broader than the vehicle base panel aperture to attach the trim component to the vehicle base panel. The method may further include the step of providing the second end of the locator projection with a substantially conical opening in the form of an indentation for receiving and maintaining the screw in position. The conical opening may be deformable or divisible upon receiving the screw therein. The method may further include the steps of forming the trim component of plastic or another moldable material, and/or forming the second end of said locator projection substantially flush to an outer surface of the trim component.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 1 is an illustration of a related-art vehicle trim locating and attachment system for attachment of a trim component onto a vehicle sheet metal panel;

FIG. 2 is an illustration of the vehicle trim locating and attachment system according to the present invention, illustrating a side sectional view of a trim component prior to being located relative to a vehicle frame or metal panel;

FIG. 3 is another illustration of the vehicle trim locating and attachment system of FIG. 2, illustrating a side sectional view of the trim component after being located relative to the vehicle frame or metal panel;

FIG. 4 is another illustration of the vehicle trim locating and attachment system of FIG. 2, illustrating a side sectional view of the trim component after being located relative to the vehicle frame or metal panel, and after insertion of a screw into a locator projection; and FIG. 5 is another illustration of the vehicle trim locating and attachment system of FIG. 2, illustrating an isometric view of the trim component prior to being located relative to the vehicle frame or metal panel.

DETAILED DESCRIPTION OF THE PREFERRED EMBODIMENTS

Referring now to the drawings wherein like reference numerals designate corresponding parts throughout the several views, FIGS. 2-5 illustrate a vehicle trim locating and attachment system according to the present invention, generally designated "component connection system 30."

Referring to FIGS. 2-5, component connection system 30 may generally be used with a vehicle trim component 32, such as a door trim, console attachment, and a variety of other components which require attachment to a vehicle frame or inner (i.e. hidden) panel 34, as would be evident to those skilled in the art. Trim component 32 may be formed of plastic or other moldable materials, or may include a moldable base layer (not shown) having a foam or another skin layer provided thereon. A substantially cylindrical locator projection 36 may be formed on the lower surface of component 32 (or its base layer) during the manufacturing process of component 32, or may otherwise be fixedly attached to component 32 by means of adhesive or other known attachment means.

As shown in FIGS. 2 and 3, in the particular embodiment illustrated, locator projection 36 may include an outer attachment ring-shaped area 38 formed with component 32 and an inner conical opening 40 in the form of an indentation, also formed during the manufacture of component 32. Opening 40 may be likewise formed of another profile, i.e. circular or otherwise tapered, for permitting insertion and retention of screw 46. A first end 42 of projection 36 may be sized and shaped for insertion in a complementary aperture 44 formed in inner panel 34. First end 42 and the body of projection 36 may be formed of a cylindrical profile as illustrated, or may otherwise be formed of a rectangular or another profile shape, as would be evident to those skilled in the art, for passage through complementary aperture 44 in panel 34.

As shown in FIG. 3 and as discussed in further detail below, a threaded fastener, such as a screw 46 may be used to fixedly attach component 32 to inner panel 34. Screw 46 may include a flat head 48 and a plurality of teeth 50 for penetrating into the material of projection 36 when inserted into opening 40. Alternatively, instead of screw 46, other attachment means such as a bolt or another device which can be inserted into opening 40 to expand or divide projection 36, as discussed below, may be utilized.

Referring next to FIG. 4, opening 40 of locator projection 36 may be formed to include a narrow conical end 54 which permits projection 36 to expand and divide as shown as screw 46 is inserted therein. The provision of conical end 54 may thus provide a narrow area for facilitating division of locator projection 36. A thin wall (not shown) may be formed from end 54 of opening 40 to first end 42 for facilitating division of projection 36 in a predetermined manner. A second end 52 of projection 36 (as well as the contact area of trim component 32) may act as a nut to retain screw 46 as shown, and thus fixedly attach component 32 to inner panel 34. Second end 52 of projection 36 may also remain positively engaged with trim component 32 by the provision of ring-shaped area 38, which remains connected to component 32 and bends outwards as shown.

The installation and removal method of component connection system 30 will now be described in detail with reference to FIGS. 2-5.

Specifically, as shown in FIG. 2, in order to install vehicle trim component 32 to inner panel 34, component 32 may first be located relative to panel 34 by inserting projection 36 within aperture 44 of panel 34. With projection 36 completely (or substantially) inserted into aperture 44, screw 46 (or another attachment means) may then be inserted into opening 40 of projection 36, and screwed in until projection 36 expands and divides as shown in FIG. 4. With projection 36 disposed in the expanded/engaged configuration shown in FIG. 4, trim component 32 may thus be fixedly attached to panel 34.

In order to thereafter remove and/or replace trim component 32, screw 46 may be rotated in an opposite direction as that for attachment of component 32, and removed from opening 40. Trim component 32 may thereafter be removed and/or replaced as needed by being pulled away from panel 34 to remove projection 36 from aperture 44.

It should be noted that various modifications may be made to the features of component connection system 30 described above without departing from the scope of the present invention. For example, as discussed above, while designations such as trim component 32 and inner panel 34 have been provided for illustrative purposes only, component connection system 30 described above may be utilized for connecting a variety of interior as well as exterior components in a vehicle, as would be evident to those skilled in the art. Further, although locator projection 36 is illustrated as being formed flush with the outer surface of component 32, end 52 of locator projection 36 may be counter-sunk to allow head 48 of screw 46 to be disposed flush with the outer surface of component 32, or may otherwise be disposed at a predetermined height relative to the outer surface of component 32 for providing a desired aesthetic finish. Yet further, locator projection 36 may include a plurality of longitudinal slits or other cut areas for facilitating expansion and/or division thereof upon insertion of screw 46.

To summarize, the present invention thus provides a component connection system which eliminates the requirement for manufacturing separate locator pins and/or apertures in a trim component, as well as in the vehicle frame or base panel, as illustrated and discussed above with reference to FIG. 1. The present invention component connection system further eliminates the need for separate locating and attachment assembly operations during the component attachment process, and utilizes only a single locating and attachment area, thus minimizing tool access area requirements. Yet further, the present invention component connection system provides for positive and repeatable location capabilities for locating a trim component relative to an inner panel, and further provides for secure connection of the trim component to the inner panel with a minimal number of sub-components for thus facilitating the manufacture, assembly and disassembly of the components described herein.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle trim component locating and attachment system for connecting a trim component to a vehicle base panel having an aperture, said system comprising:
   a locator projection integrally formed on the trim component and including first and second ends, said first end being substantially closed and being configured to substantially fit and project through the vehicle base panel aperture, and said second end being configured to receive a screw,
   wherein said locator projection provides for location of the trim component relative to the vehicle base panel, and further provides for secure attachment of the trim component to the vehicle base panel by the screw.

2. A system according to claim 1, wherein said locator projection is deformable or divisible from a disengaged position to an engaged position when the screw is received therein, in said disengaged position, said locator projection removably fits and projects through the vehicle base panel aperture, and in said engaged position, said second end contracts around the screw to retain the screw in position and said first end expands substantially broader than the vehicle base panel aperture to connect the trim component to the vehicle base panel.

3. A system according to claim 1, wherein said second end of said locator projection includes a substantially conical opening for receiving and maintaining the screw in position.

4. A system according to claim 3, wherein said conical opening is deformable or divisible upon receiving the screw therein.

5. A system according to claim 1, wherein the trim component is made of plastic or another moldable material.

6. A system according to claim 1, wherein said locator projection is a halved pin.

7. A system according to claim 1, wherein said second end of said locator projection is disposed substantially flush to an outer surface of the trim component.

8. A vehicle component locating and attachment system for connecting a component to a vehicle base structure having an aperture, said system comprising:
   a locator projection integrally formed on or fixedly attached to the component and including first and second ends, said first end being substantially closed and being configured to substantially fit and project through the vehicle base structure aperture, and said second end being configured to receive an attachment means,
   wherein said locator projection provides for location of the component relative to the vehicle base structure, and further provides for secure attachment of the component to the vehicle base structure by the attachment means.

9. A system according to claim 8, wherein said locator projection is deformable or divisible from a disengaged position to an engaged position when the attachment means is received therein, in said disengaged position, said locator projection removably fits and projects through the vehicle base structure aperture, and in said engaged position, said second end contracts around the attachment means to retain the attachment means in position and said first end expands substantially broader than the vehicle base structure aperture to connect the component to the vehicle base structure.

10. A system according to claim 8, wherein said second end of said locator projection includes a substantially conical opening for receiving and maintaining the attachment means in position.

11. A system according to claim 10, wherein said conical opening is deformable or divisible upon receiving the attachment means therein.

12. A system according to claim 8, wherein the component is made of plastic or another moldable material.

13. A system according to claim 8, wherein said locator projection is a halved pin.

14. A system according to claim 8, wherein said second end of said locator projection is disposed substantially flush to an outer surface of the component.

15. A method of locating and attaching vehicle trim components, said method comprising the steps of:
   forming an aperture in a vehicle base panel;
   providing a trim component for attachment to the vehicle base panel, the trim component including a locator projection including first and second ends, said first end being substantially closed and being configured to substantially fit and project through the aperture;
   locating the trim component relative to the vehicle base panel by inserting said locator projection within the aperture; and
   attaching the trim component to the vehicle base panel by inserting a screw in said locator projection while said locator projection is positioned within the aperture in the vehicle base panel.

16. A method according to claim 15, wherein said locator projection is deformable or divisible from a disengaged position to an engaged position when the screw is received therein, in said disengaged position, said locator projection removably fits and projects through the vehicle base panel aperture, and in said engaged position, said second end contracts around the screw to retain the screw in position and said first end expands substantially broader than the vehicle base panel aperture to attach the trim component to the vehicle base panel.

17. A method according to claim 15, further comprising the step of providing said second end of said locator projection with a substantially conical opening for receiving and maintaining the screw in position.

18. A method according to claim 17, wherein said conical opening is deformable or divisible upon receiving the screw therein.

19. A method according to claim 15, further comprising the step of forming the trim component of plastic or another moldable material.

20. A method according to claim 15, further comprising the step of forming said second end of said locator projection substantially flush to an outer surface of the trim component.

21. A vehicle trim component locating and attachment system for connecting a trim component to a vehicle base panel having an aperture, said system comprising:
   a locator projection integrally formed on the trim component and including first and second ends, said first end being configured to substantially fit and project through the vehicle base panel aperture, and said second end being configured to receive a screw,
   wherein said locator projection provides for location of the trim component relative to the vehicle base panel, and further provides for secure attachment of the trim component to the vehicle base panel by the screw, and wherein said locator projection is deformable or divisible from a disengaged position to an engaged position when the screw is received therein, in said disengaged position, said locator projection removably fits and projects through the vehicle base panel aperture, and in said engaged position, said second end contracts around the screw to retain the screw in position and said first end expands substantially broader than the vehicle base panel aperture to connect the trim component to the vehicle base panel.

22. A system according to claim 21, wherein said second end of said locator projection includes a substantially conical opening for receiving and maintaining the screw in position.

* * * * *

UNITED STATES PATENT AND TRADEMARK OFFICE
CERTIFICATE OF CORRECTION

PATENT NO.         : 7,267,385 B2
APPLICATION NO. : 11/161836
DATED              : September 11, 2007
INVENTOR(S)        : Michael Williams, Peter Bejin and Kaushlendra Singh It is certified that error appears in the above-identified patent and that said Letters Patent is hereby corrected as shown below:

On the Title page of the Letters Patent, "(74) Attorney, Agent or Firm--Dykema Gossett PLLC" should appear as follows:

-- (74) Attorney, Agent or Firm -- Gigette Bejin, Esq.; Dykema Gossett PLLC --

Signed and Sealed this

Twenty-seventh Day of November, 2007

JON W. DUDAS
*Director of the United States Patent and Trademark Office*